United States Patent [19]

Hurst, Jr.

[11] Patent Number: 5,031,030
[45] Date of Patent: Jul. 9, 1991

[54] VIDEO SIGNAL ENCODED WITH ADDITIONAL DETAIL INFORMATION

[75] Inventor: Robert N. Hurst, Jr., Hopewell, N.J.

[73] Assignee: General Electric Company, Princeton, N.J.

[21] Appl. No.: 570,260

[22] Filed: Aug. 20, 1990

[51] Int. Cl.⁵ .................... H04N 11/14; H04N 7/08
[52] U.S. Cl. ................................. 358/12; 358/16; 358/142
[58] Field of Search ............... 358/11, 12, 21 R, 141, 358/142, 146, 16, 31, 105

[56] References Cited

U.S. PATENT DOCUMENTS

| | | | |
|---|---|---|---|
| 2,716,151 | 8/1955 | Smith | 358/141 |
| 4,520,385 | 5/1985 | Jackson | 358/12 |
| 4,660,072 | 4/1987 | Fukinuki | 358/12 |
| 4,745,460 | 5/1988 | Fukinuki | 358/12 |
| 4,885,631 | 12/1989 | Fukinuki et al. | 358/21 |

FOREIGN PATENT DOCUMENTS 2101835 1/1983 United Kingdom .................. 358/16

OTHER PUBLICATIONS

"Experiments on Proposd Extended-Definition TV with Full NTSC Compatability", by T. Fukinuki et al., SMPTE Journal, Oct. 1984, pp. 923-929.
"An HDTV Broadcasting System Utilizing a Bandwidth Compression Technique-MUSE", by Y. Ninomiya et al., IEEE Translations on Broadcasting, vol. BC-33, No. 4, Dec. 1987.

Primary Examiner—Tommy P. Chin
Attorney, Agent, or Firm—Joseph S. Tripoli; Eric P. Herrmann; Ronald H. Kurdyla

[57] ABSTRACT

In a system for encoding and decoding high frequency video information, an input video signal includes a high frequency band containing information to be encoded, and a lower frequency band. The frequency spectrum of the input video signal is folded around a frequency in the lower frequency band. A resulting folded video signal is combined with the input video signal to produce a combined signal which is low pass filtered by a filter having a cut-off frequency corresponding to the folding frequency. The filtered combined signal is separated into its constituent filtered video signal and filtered folded video signal parts. The separated folded video signal component is unfolded around the folding frequency to produce an unfolded video signal with frequencies in the high frequency band. The unfolded video signal is joined to the high frequency band of the separated video signal to produce an output video signal having a high frequency band with the uppermost frequencies thereof determined primarily by the unfolded video signal.

18 Claims, 4 Drawing Sheets

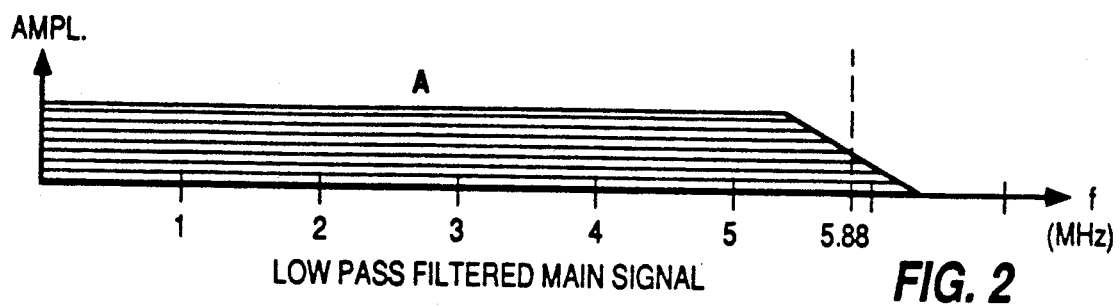
FIG. 2 LOW PASS FILTERED MAIN SIGNAL
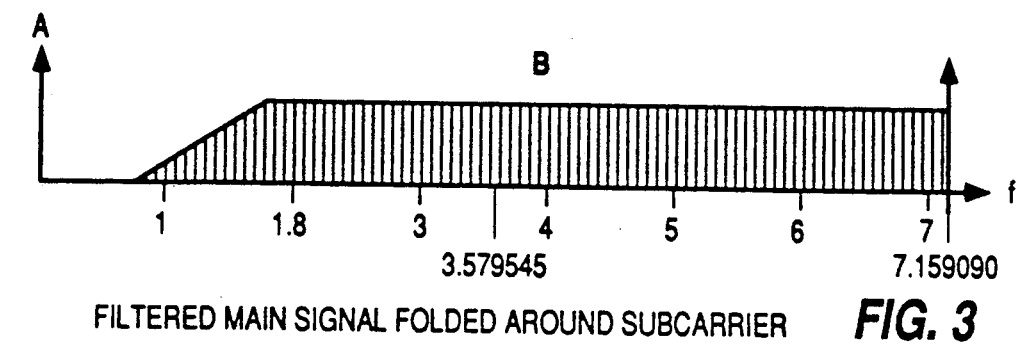
FIG. 3 FILTERED MAIN SIGNAL FOLDED AROUND SUBCARRIER
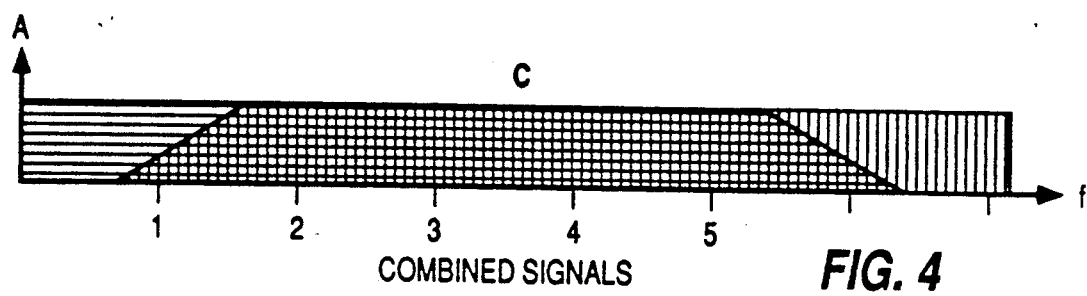
FIG. 4 COMBINED SIGNALS
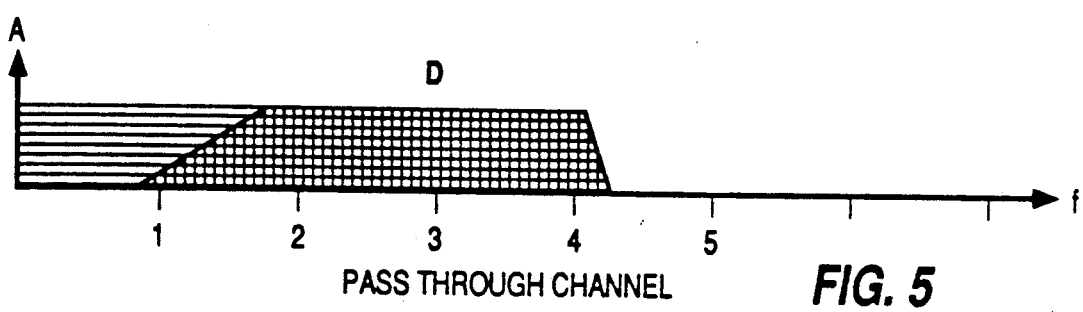
FIG. 5 PASS THROUGH CHANNEL
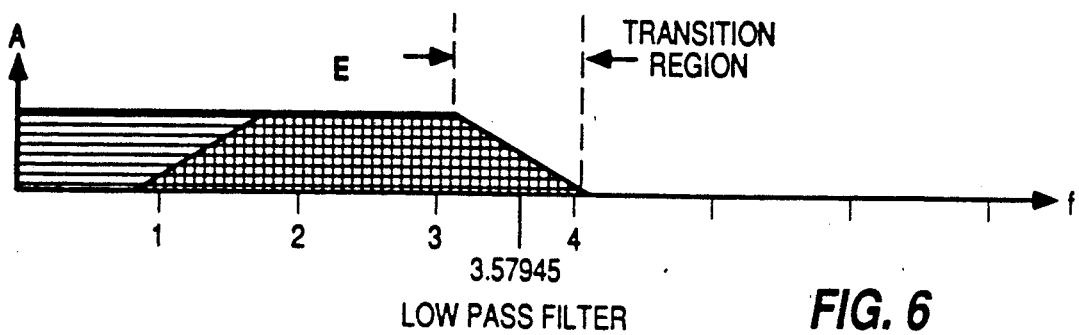
FIG. 6 LOW PASS FILTER

HIGHS UNFOLDED AROUND SUBCARRIER

UNFOLDED HIGHS ADDED TO MAIN SIGNAL

VIDEO SIGNAL ENCODED WITH ADDITIONAL DETAIL INFORMATION

FIELD OF THE INVENTION

This invention concerns apparatus for adding extra image detail information to a television-type video signal for improving the resolution of a displayed image. In particular, this invention concerns apparatus for encoding such information so as to be compatible with a pre-existing television-type signal.

BACKGROUND OF THE INVENTION

A standard television signal, such as a signal according to NTSC standards for example, is restricted to a limited bandwidth and correspondingly exhibits limited horizontal resolution of a displayed image. The horizontal resolution of a displayed image is primarily determined by the luminance component of the television signal, which according to NTSC standards is restricted to an upper frequency limit of 4.2 MHz. Improving the resolution of an NTSC image requires that the luminance bandwidth be increased, e.g., to 6 MHz, to accommodate the extra horizontal high frequency information needed for this purpose. Such an increase in bandwidth would require that existing television standards be modified, which is an unlikely prospect.

Techniques have been proposed for compatibly encoding additional high frequency image detail information within the limits of pre-existing television signal bandwidth standards. Such encoding produces an extended definition video signal which is not only compatible with pre-existing television receivers, but also can be taken full advantage of by extended definition receivers to produce a higher resolution displayed image compared to a standard receiver. Illustratively, in one proposed encoding scheme the desired image enhancing additional high frequency information (e.g., 5-6 MHz) is selected such as by means of a bandpass filter, then heterodyned down to a lower 1 MHz frequency range within the standard 4.2 MHz video signal baseband spectrum. This 1 MHz heterodyned frequency portion then modulates a selected phase of an auxiliary subcarrier at a prescribed frequency within the standard video baseband spectrum. At a decoder in an enhanced definition television receiver, the additional high frequency information is demodulated and added to, i.e., "knitted" to, the upper portion of the high frequency band of the standard video frequency spectrum to produce a video signal with enhanced image definition. The encoded signal can otherwise be received and processed by a standard television receiver without degrading a standard displayed image, but without providing enhanced image resolution.

Encoding processes which involve a "knitting" together of signal components having different frequency spectra (after decoding) are not without problems. For example, some encoding systems require nearly ideal filters to work well. In other cases unwanted signal aliasing effects may result, such as when the signal to be encoded is heterodyned or shifted to or near DC, also due to the use of imperfect filters without a flat passband and having a very steep attenuation region. Furthermore, the main portion of the video signal spectrum to which the additional high frequency spectrum is abutted typically will have experienced significantly different signal processing, such as channel filtering for example. Such different processing is likely to produce significantly different amplitude and phase characteristics for the two signal spectrums being joined together. This is particularly true with respect to the high frequency spectrum, where the response is a function of the output filter at the transmitter and the RF (radio frequency) and IF (intermediate frequency) signal processing units at the receiver. The phase response for the high frequency spectrum is not as well controlled as that of the low frequency spectrum, and gradually worsens with increasing frequency. Also, when the main video signal and the additional high frequency component are joined together at the upper end of the high frequency spectrum of the main video signal, an amplitude dip often results around the region where the signals are joined. Even if an amplitude dip does not occur, a phase mismatch could occur. Amplitude and phase problems associated with joining or "knitting" an additional high frequency component to a main video signal are substantially eliminated by the disclosed encoding system according to the present invention, which produces an encoded television signal compatible with pre-existing television standards.

SUMMARY OF THE INVENTION

In a system in accordance with the principles of the present invention for encoding and decoding high frequency video information, an input video signal includes a high frequency band containing information to be encoded, and a lower frequency band. The frequency spectrum of the input video signal is folded around a frequency in the lower frequency band. A resulting folded video signal is combined with the input video signal to produce a combined signal which is low pass filtered by a filter having a cut-off frequency corresponding to the folding frequency. The filtered combined signal is then separated into its constituent filtered video signal and filtered folded video signal parts. The separated folded video signal component is unfolded around the folding frequency to produce an unfolded video signal with frequencies in the high frequency band. The unfolded video signal is joined to the high frequency band of the separated video signal to produce an output video signal having a high frequency band with the uppermost frequencies thereof determined primarily by the unfolded video signal.

BRIEF DESCRIPTION OF THE DRAWING

FIGS. 2-9 depict amplitude-versus-frequency responses illustrating the operation of the apparatus in FIG. 1.

DETAILED DESCRIPTION

Figure 1:
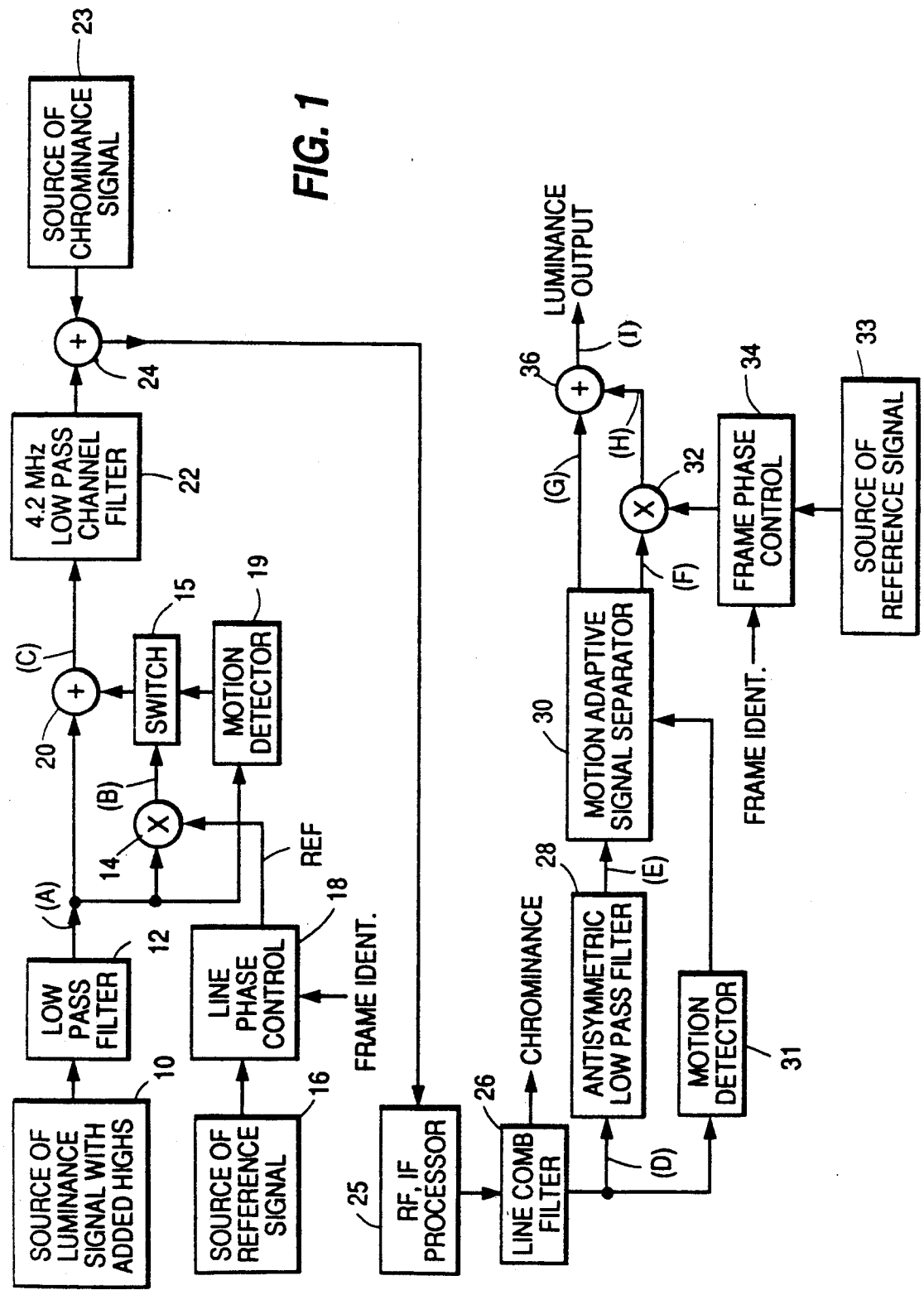
FIG. 1 is a block diagram of apparatus according to the present invention.

It will be helpful to review the amplitude versus frequency responses shown in FIGS. 2-9 before considering the apparatus of FIG. 1.

In FIG. 2 a luminance signal from a wideband video source such as a television camera is low pass filtered to restrict its horizontal high frequency range to 5.88 MHz in this example, which exceeds the 4.2 MHz horizontal frequency bandwidth of a standard NTSC television signal. This frequency is not critical, and is a function of the nature and requirements of a particular video signal processing system. The choice of this frequency determines how far the frequency spectrum of a frequency-folded signal extends down into the frequency spectrum of the 5.88 MHz low pass filtered signal (hereinafter referred to as the main signal) as will be discussed.

In FIG. 3 the low pass filtered main signal of FIG. 2 is pivoted or folded around a 3.58 MHz chrominance subcarrier frequency (more precisely, 3.579545 MHz) to produce a folded signal. The folding operation is accomplished by modulating the signal with a carrier at twice the 3.58 MHz folding frequency, i.e., 7.159 MHz. The modulation process employs a signal multiplier as will be seen in FIG. 1, and generates an upper sideband component (not shown in FIG. 3). The upper sideband component can be removed by a suitable filter in the output path of the modulator, or by a channel filter such as filter 22 shown in FIG. 1. The choice of the chrominance subcarrier frequency as the folding frequency is not critical and depends upon the requirements of a particular system. In this case the standard chrominance subcarrier frequency was convenient to use. The baseband low pass filtered folded main signal (FIG. 3) and the baseband low pass filtered main signal (FIG. 2) are combined as shown in FIG. 4.

The combined baseband signal of FIG. 4 is conveyed via a transmission channel, which in the case of a television system includes a bandwidth limiting 4.2 MHz low pass channel filter at the transmitter, and RF/IF signal processing and demodulating circuits at a receiver. The combined signal after passing through the transmission channel is shown in FIG. 5. The steepness of the amplitude attenuation at the upper end of the frequency spectrum around the 4.2 MHz channel limit frequency is somewhat unpredictable and is due to the combined effect of the 4.2 MHz channel limiting filter at the transmitter, and the RF/IF signal processing networks at the receiver. Not shown is possible phase response error that could appear at the upper end of the frequency spectrum.

Figure 8:
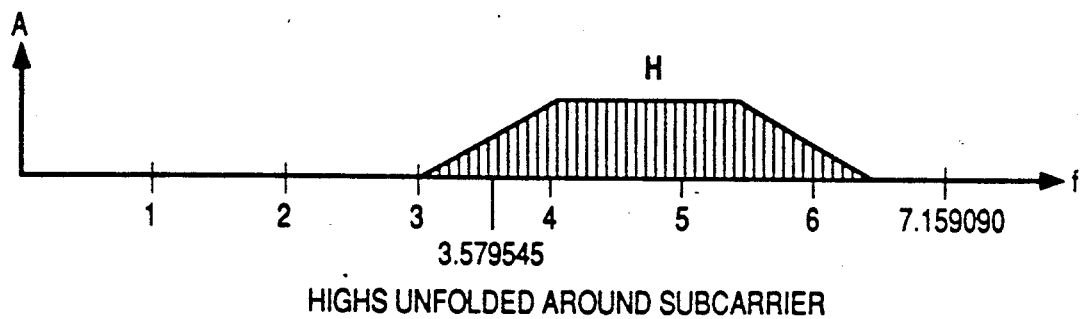

The signal shown in FIG. 5 is low pass filtered with a cut-off frequency at the folding frequency, i.e., the chrominance subcarrier frequency, as shown in FIG. 6. The amplitude response over the transition region is anti-symmetrical with respect to the folding frequency. The slope of the amplitude response over the transition region surrounding the cut-off frequency is such that, for frequencies in the transition region, the amplitude of the folded highs signal and an unfolded highs signal as shown in FIG. 8 add to unity to produce a substantially flat amplitude response over the transition region. The low pass filter response produces significant attenuation at the band edge in the vicinity of 4.2 MHz, encompassing those band edge frequencies subject to exhibiting unpredictably corrupted amplitude and phase characteristics. In this example the low pass filtering action illustrated by FIG. 6 produces an amplitude response of only about 10% at 4.08 MHz. A filter producing the response of FIG. 6 could be located in either the transmitter or receiver of a broadcast television system, but better noise suppression results when the filter is located in the receiver as illustrated.

Figure 7:
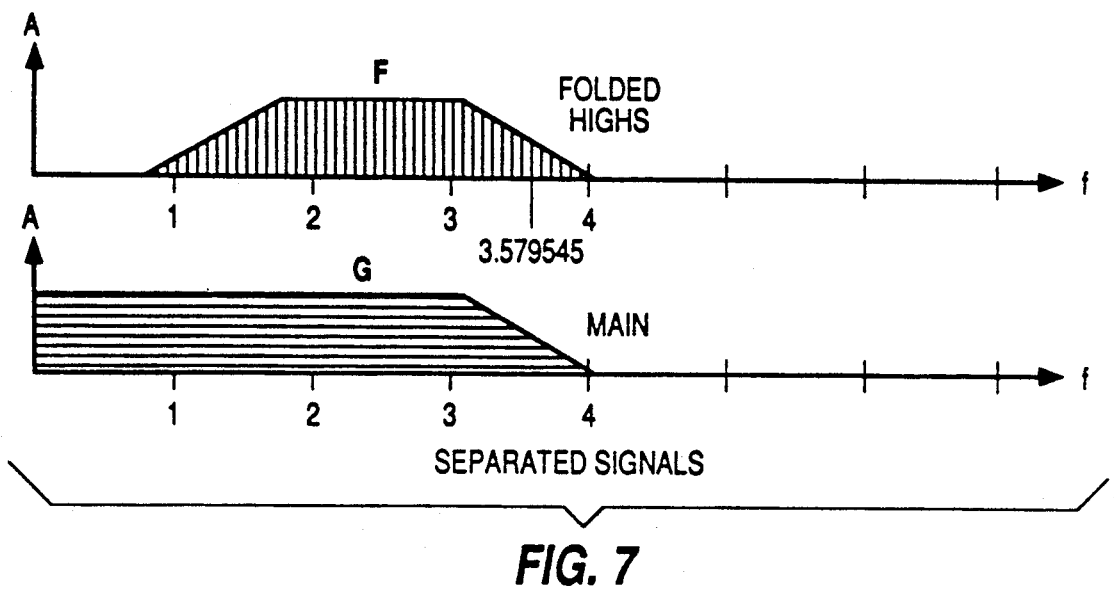

The low pass filtered signal of FIG. 6 is then separated into its constituent components: the main signal after channel filtering as discussed in connection with FIG. 5, and the low pass filtered folded highs signal discussed in connection with FIG. 6. The folded highs component shown in the upper diagram of FIG. 7 is unfolded by pivoting around the 3.58 MHz folding frequency to produce the unfolded high frequency spectrum shown in FIG. 8. This unfolded high frequency spectrum component is joined to the upper end of the high frequency portion of the separated main signal shown in the lower diagram of FIG. 7 to produce the extended definition video signal spectrum shown in FIG. 9, substantially without amplitude or phase distortion in the region where the signal components are joined. This effect results primarily from the low pass filtering amplitude response in the transition region as discussed in connection with FIG. 6.

The signal depicted by FIG. 5, including a main signal component and an additional high frequency component folded within the frequency spectrum of the main component as discussed, is compatible with a standard NTSC television receiver. The folding process can introduce artifacts in the form of "beats" along image edges, but such artifacts, if noticeable, typically do not significantly impair the quality of a displayed image. When the signal of FIG. 5 is unfolded as discussed in connection with FIGS. 6-8 by means of a decoder in an extended definition television receiver, the resulting signal (FIG. 9) is advantageously used to produce a higher resolution image display.

The signal amplitude-versus-frequency responses shown in FIGS. 2-9 are produced by the apparatus shown in FIG. 1. Signals labeled (A) through (I) in FIG. 1 correspond to the signal responses shown in FIGS. 2 through 9, respectively.

A source of wideband luminance signal 10, e.g., a portion of a television camera, includes a high frequency component ("added highs") above the 4.2 MHz channel frequency limit for a standard NTSC system. The added highs provide enhanced image resolution and, in this example, are present in the luminance signal only for motionless images, when extra image resolution is most readily noticed. The signal from source 10 is processed by a 5.88 MHz horizontal low pass filter 12 to produce an output signal (A) shown in FIG. 2.

A signal multiplier 14, i.e., a modulator, responds to output signal (A) from filter 12 and to a sinusoidal reference signal REF. The reference signal is produced by a source 16 and exhibits a frequency of 7.1590 MHz, twice the 3.58 MHz folding frequency. The phase of the reference signal is controlled so that it inverts from one image frame to the next. This phase control is performed by a frame phase control unit 18 in response to a FRAME IDENT (frame identifier) signal, and represents an additional encoding process which will enable frequency folded signal (B) shown in FIG. 3 to be sensed and recovered at a receiver after being combined with luminance signal (A) in an adder 20. Frame phase control dictates the need for detecting the presence or absence of a motionless image, in which case the output path from multiplier 14 is enabled or disabled respectively. An electronic switch 15 and a motion detector 19 of conventional design are included for this purpose. An output control signal from motion detector 19, developed in response to the output signed from filter 12, enables switch 15 to conduct the output signal from multiplier 14 to adder 20 when image motion is detected. At other times, switch 15 is rendered non-conductive and the output of multiplier 14 is decoupled from adder 20.

Signal (C) shown in FIG. 4 is produced when the frequency folded signal from the output of multiplier 14 is combined with the output signal from filter 12 in adder 20. Signal (C) is filtered by a 4.2 MHz horizontal low pass filter 22, which limits the frequency spectrum of signal (C) to the NTSC luminance channel bandwidth. A chrominance information signal from a source 23 (e.g., a portion of the television camera) is combined with the filtered luminance signal from filter 22 in an adder 24. The combined luminance/chrominance signal is conveyed via terrestrial broadcast, cable or other conventional means to a receiver having an RF (radio frequency) and IF (intermediate frequency) processor 25, which also includes demodulator circuits. Output luminance signal (D) from processor 25, after chrominance information is separated by means of a line comb filter 26, is shown in FIG. 5.

Signal (D) is filtered by an anti-symmetric 3.58 MHz horizontal lowpass filter 28 to produce signal (E) shown in previously discussed FIG. 6. Signal (E) is separated into its constituent folded signal component (F) and main signal component (G) by means of a motion adaptive signal separator 30. Separator 30 includes a frame phase decoder for sensing the frame-to-frame phase changes of the folded highs signal produced at the transmitter/encoder. Low pass filter 28 could have been located in each of the output paths of separator 30 rather than in the input path as shown. Signal separator 30 responds to a control signal provided by a motion detector 31 of conventional design, which senses luminance signal (D). Details of motion adaptive signal separator 30 are shown in FIG. 10, which will be discussed subsequently.

Figure 9:
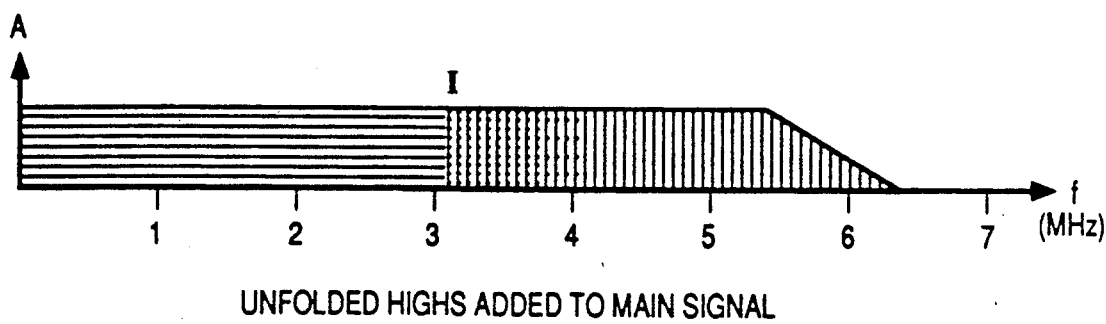

The separated folded highs output signal (F) from separator 30 is applied to one input of a multiplier 32 (i.e., a demodulator), the other input of which receives a reference signal from a source 33 via a frame phase control unit 34. The reference signal applied to multiplier 32 exhibits the same frequency and phase characteristics as reference signal REF at the transmitter/encoder, in particular a phase which changes from frame-to-frame. Such phase control is produced by control unit 34. The output signal from multiplier 32, unfolded highs signal (H) shown in FIG. 8, is combined with signal (G) from separator 30 in an adder 36 to produce reconstituted wideband luminance signal (I) including the additional high frequency information for enhancing image resolution (FIG. 9).

Figure 10:
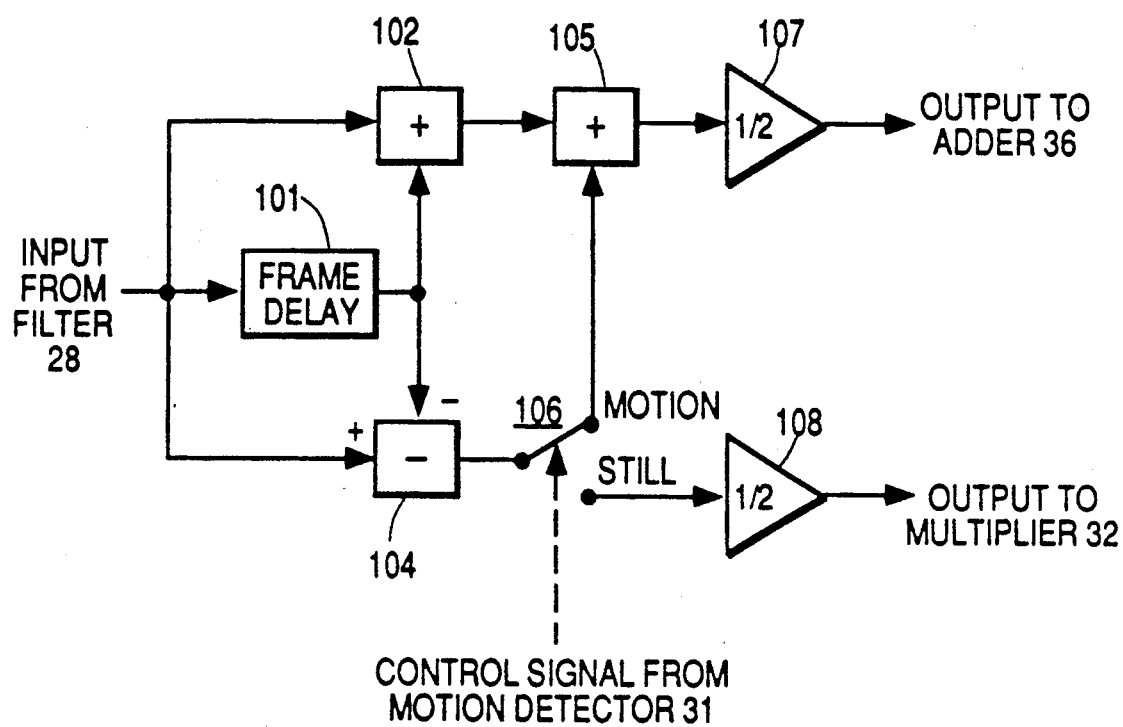
FIG. 10 shows details of a portion of the apparatus of FIG. 1.

FIG. 10 shows details of motion adaptive signal separator 30 in FIG. 1. Input signals are provided from filter 28 (FIG. 1) to a 525H frame delay device 101, to an adder 102 and to an input of a subtracter 104. A frame delayed output signal from unit 101 is coupled to respective inputs of adder 102 and subtracter 104 as shown. An adder 105 sums an output signal from adder 102 with an output signal from subtracter 104 as provided via an electronic switch 106 when in the position shown in the presence of image motion. The output signal from subtractor 104 is summed with the output signal from adder 102 only in the presence of image motion. The signal from adder 105 is conveyed via an attenuator 107 to adder 36 in FIG. 1. In the presence of a still (motionless) image, switch 106 occupies the STILL position so that the output from subtracter 104 is decoupled from adder 105 and is instead conveyed via switch 106 and an attenuator 108 to multiplier 32 in FIG. 1.

The position of switch 106 is controlled by a control signal from motion detector 31 in FIG. 1. Attenuators 107 and 108 act as amplitude scaling devices so that the output signals provided to adder 36 and multiplier 32 exhibit similar amplitudes.

What is claimed is:

1. In a system for processing a television-type signal, apparatus for processing high frequency video information comprising:
   means for providing an input image representative video signal having a frequency spectrum including a high frequency band containing information to be encoded, and a lower frequency band;
   means for folding said frequency spectrum of said input video signal around a prescribed folding frequency in said lower frequency band to provide a folded video signal;
   means for combining said input video signal and said folded video signal to produce a combined video signal; and
   means for low pass filtering said combined video signal to provide a filtered signal, said low pass filtering means having a cut-off frequency corresponding to said folding frequency.

2. A system according to claim 1, wherein
   said low pass filtering means exhibits and amplitude attenuation characteristic that is substantially anti-symmetrical with respect to said folding frequency.

3. A system according to claim 1, wherein
   said input video signal is a wideband video signal; and
   said combined video signal is subject to being conveyed via a transmission channel including bandwidth restricting means whereby an output signal from said transmission channel exhibits a narrow bandwidth relative to said input video signal.

4. A system according to claim 1, wherein
   said input signal is a luminance signal; and
   said folding frequency is the frequency of a chrominance subcarrier.

5. A system according to claim 3, wherein
   an output video signal from said transmission channel exhibits a bandwidth compatible with NTSC standards.

6. In a system for processing a television-type signal, apparatus for encoding and decoding high frequency video information comprising:
   means for providing an input image representative video signal having a frequency spectrum including a high frequency band containing information to be encoded, and a lower frequency band;
   means for folding said frequency spectrum of said input video signal around a prescribed folding frequency in said lower frequency band to provide a folded video signal;
   means for combining said input video signal and said folded video signal to produce a combined video signal;
   means for low pass filtering said combined video signal to provide a filtered signal, said low pass filtering means having a cut-off frequency corresponding to said folding frequency;
   means for separating said filtered combined signal into a filtered video signal component and a filtered folded video signal component;
   means for unfolding said filtered folded video signal component around said folding frequency to produce an unfolded video signal containing frequencies in said high frequency band; and
   means for joining said unfolded video signal to said high frequency band of said filtered video signal component from said separating means to produce an output video signal having a high frequency band with the uppermost frequencies thereof being determined primarily by said unfolded video signal.

7. A system according to claim 6, wherein said low pass filtering means exhibits an amplitude attenuation characteristic that is substantially anti-symmetrical with respect to said folding frequency.

8. A system according to claim 6, wherein
said input video signal is a wideband video signal;
said combined video signal is conveyed via a transmission channel including bandwidth restricting means whereby an output signal from said transmission channel exhibits a narrow bandwidth relative to said input video signal, said output signal from said transmission channel being applied to said low pass filtering means; and
said output video signal is a wideband video signal relative to said output signal from said transmission channel.

9. A system according to claim 6, wherein
said input signal is a luminance signal; and
said folding frequency is the frequency of a chrominance subcarrier.

10. A system according to claim 8, wherein an output video signal from said transmission channel exhibits a bandwidth compatible with NTSC standards.

11. In a receiver for processing a received television-type video signal with a first component occupying upper and lower frequency bands, said upper frequency band containing an encoded second component, apparatus comprising:
means for low pass filtering said video signal to provide a filtered video signal, said low pass filtering means having a cut-off frequency within said upper frequency band;
means responsive to said filtered video signal for separating said first and second components;
means for unfolding the frequency spectrum of said separated second component around said cut-off frequency of said low pass filtering means; and means for combining said unfolded separated second component with said separated first component to produce an output video signal with the highest frequencies thereof determined primarily by the frequency spectrum of said unfolded second component.

12. A system according to claim 11, wherein
said low pass filtering means exhibits an amplitude attenuation characteristic that is substantially anti-symmetrical with respect to said cut-off frequency.

13. A system according to claim 11, wherein
said video signal is a luminance signal; and
said cut-off frequency is the frequency of a chrominance subcarrier.

14. A system according to claim 11, wherein
said received video signal exhibits a bandwidth compatible with NTSC standards.

15. A system according to claim 11, wherein
said second component is present only during substantially motionless images; and
said separating means is motion adaptive.

16. Apparatus according to claim 11, wherein
said unfolding means comprises signal multiplier means responsive to said separated second component and to a reference signal.

17. Apparatus according to claim 16, wherein
said reference signal exhibits a controlled phase.

18. Apparatus according to claim 11, wherein
said received television-type video signal contains chrominance information, and luminance information comprising said first and second components;
said encoded second component reverses phase from one image frame to the next and is present only during substantially motionless images;
said separating means is responsive to said luminance information and is motion adaptive; and
said unfolding means responds to a reference signal having a phase which reverses from frame to frame.

* * * * *

Adverse Decisions In Interference

Patent No. 5,031,030, Robert N. Hurst, VIDEO SIGNAL ENCODED WITH ADDITIONAL DETAIL INFORMATION, Interference No. 104,171, final judgment adverse to the patentee rendered May 14, 1998 as to claims 1-18.

*(Official Gazette July 7, 1998)*